May 1, 1928.
T. C. DELAVAL-CROW ET AL
1,668,105
METHOD OF MOUNTING BEARINGS
Filed May 28, 1925
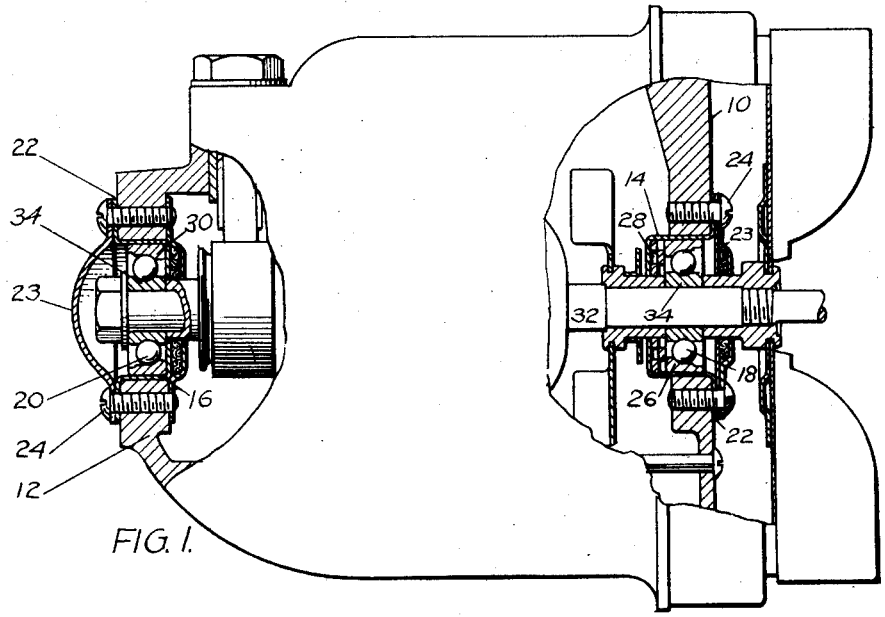
FIG. 1.
FIG. 2.
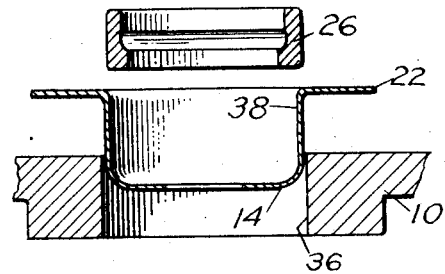
FIG. 3.
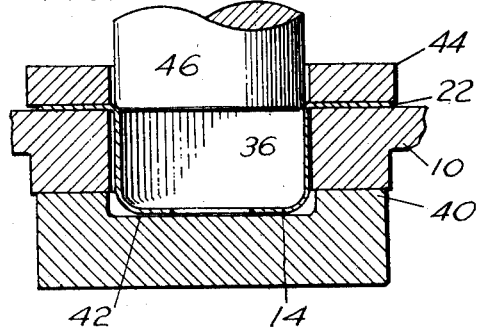
FIG. 4.
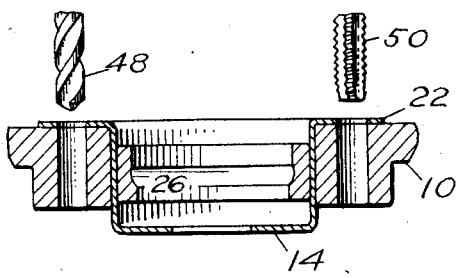
INVENTORS:
T. C. DELAVAL-CROW
C. B. SIMMONS,
BY *Gales* ...
THEIR ATTORNEY Patented May 1, 1928.

1,668,105

UNITED STATES PATENT OFFICE.

THOMAS C. DELAVAL-CROW AND CHARLES B. SIMMONS, OF BRISTOL, CONNECTICUT, ASSIGNORS TO THE NEW DEPARTURE MANUFACTURING COMPANY, OF BRISTOL, CONNECTICUT, A CORPORATION OF CONNECTICUT.

METHOD OF MOUNTING BEARINGS.

Application filed May 28, 1925. Serial No. 33,576.

This invention relates to bearing mountings and is herein disclosed, by way of example, as a method of forming housings for ball-bearings and fitting them in a casing.

When mounting the armature shaft of an electric motor on ball-bearings in a motor casing, it has been proposed to form cups or housings for the bearings and to secure these cups to bores in the motor casing. Such cups require for their formation a plurality of drawing operations in order to be accurately shaped and sized to receive the outer race rings of the bearings, especially if the outer race rings are to slide to take care of slight axial movement or expansion of the armature shaft. The cups must also be accurately fitted and aligned in the motor casing which requires careful machining to receive them. If the bore in a casing is too large, the cup is not properly supported and centered and, if it is too small, the forcing in of the cup impairs the fit of the race ring therein. In other words, the attempt has been to shape the cup and the bore in separate operations with consequent expense and liability of improper fit.

It is, accordingly, an object of the invention to provide an inexpensive method of accurately forming a bearing housing and fitting it in a casing. Another object is to provide an improved method of this character which will eliminate the necessity of machining the casing bore within close limits of size and yet insure proper centering and support of the bearing housing. Another object is to eliminate an extra handling of the cup, as by combining the final drawing operation with the operation of assembling the cup and casing.

To these ends and also to improve generally upon matters of this character, the invention also consists in the various matters hereinafter described and claimed.

In the drawings, Figure 1 is a side elevation, partly in section, of a motor having its armature shaft mounted on ball bearings in the ends of a casing.

Figure 2 is a sectional view illustrating, in exaggerated degree, relative initial sizes of casing bore, cup, and bearing ring.

Figure 3 is a sectional view illustrating the step of expanding and sizing the cup or bearing housing.

Figure 4 is a sectional view illustrating the step of boring and tapping the housing and the flange of the cup for cover fastening devices.

The numerals 10 and 12 indicate the ends of a motor casing having aligned bores to receive bearing housings or cups 14 and 16 for ball bearings 18 and 20. Each cup has an outwardly extending flange 22 engaging the outer face of the casing, and each cup is closed by a cap or cover plate 23 secured by screws 24 to the casing. Within the cup 14 is slidably mounted the outer race ring 26 of the ball bearing 18, the ring being yieldingly pressed away from the bottom of the cup to take up play by a spring washer 28. Within the cup 16, the outer race ring 30 of the ball bearing 20 is shown fitting against the bottom of the cup. An armature shaft 32 is supported in the bearings through the medium of inner race rings 34 clamped on the shaft. The structure described is merely illustrative of any shaft to be mounted on housed antifriction bearings in a casing.

The cups or bearing housings are first drawn to a size and shape such that they will freely enter reamed bores in the casing as indicated in Figure 2. Here the cup 14 has its exterior diameter a little smaller than bore 36 in casing 10. The inner diameter 38 of the cup 14 is also smaller than the external diameter of the outer race ring 26. The bore 36 need not be reamed to close limits of size because the cup is expanded directly into it with a tight and permanent fit, the casing 10 acting as a die. Aluminum is suitable material for the casing and brass for the cup. As shown in Figure 3, the casing 10 is supported during the cup expanding operation on a suitable base having an annular supporting rim 40 and a depressed flat face 42. The cup 14 is inserted in the bore 36 and its flange 22 is clamped by a ring 44 or the like which may be spring pressed or have some other lost-motion connection with a press ram 46 to allow relative movement of the ram through the ring after the ring engages the flange. The ram 46 has a diameter determined both by the outer diameter of race ring 26 and by the kind of fit desired and acts as an expander and sizing tool, forcing the sides of the cup tightly and permanently against the bore 36 and forming the interior of the cup to proper size for slidably receiving the race ring 26. The bottom of the cup is pressed out flat between the end of the ram and the face 42 and the ring 44 acts as a stripper when the ram is withdrawn. Thus the motor casing 10 is utilized as a die during the expanding operation and a proper fit is insured between the cup and both the bearing and the casing. The final expanding operation is also the assembling operation and one handling of the cup is eliminated. Next the casing 10 and flange 22 are simultaneously bored and tapped for the cover plate fastening screws 24, as by a drill 48 and a tap 50. The other cup is formed and fitted in a similar manner.

Although the invention has been disclosed by reference to certain specific steps, it should be understood that, in its broader aspects, it is not necessarily limited thereto.

We claim:

The method of mounting an antifriction bearing in a casing, which consists in boring a plain cylindrical hole straight through the casing, drawing a flanged cup to an exterior diameter which will freely enter the bore in the casing and to an interior diameter which is too small to receive the bearing, placing the cup in the bore with its flange against the outer face of the casing, pressing the flange against the outer face of the casing, and expanding the cup to fit exteriorly the bore of the casing and to an interior size which will receive the bearing, fastening the flange to the outer face of the casing, and inserting the bearing, substantially as described.

In testimony whereof we hereunto affix our signatures.

CHARLES B. SIMMONS.
THOMAS C. DELAVAL-CROW.